(12) United States Patent
Lee et al.

(10) Patent No.: US 8,434,112 B2
(45) Date of Patent: Apr. 30, 2013

(54) METHOD FOR UPDATING BROADCASTING PROGRAM INFORMATION IN TERMINAL AND MOBILE TERMINAL USING THE SAME

(75) Inventors: Wonjong Lee, Seoul (KR); Taejung Kwon, Seoul (KR); Bosoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 393 days.

(21) Appl. No.: 12/796,605

(22) Filed: Jun. 8, 2010

(65) Prior Publication Data

US 2010/0313222 A1  Dec. 9, 2010

(30) Foreign Application Priority Data

Jun. 8, 2009 (KR) ........................ 10-2009-0050272

(51) Int. Cl.
*H04N 5/445* (2006.01)

(52) U.S. Cl.
USPC .................................. 725/50; 725/51; 725/52

(58) Field of Classification Search .................... 725/50, 725/51, 39, 52
See application file for complete search history.

(56) References Cited

U.S. PATENT DOCUMENTS

| | | | | |
|---|---|---|---|---|
| 6,898,762 | B2 * | 5/2005 | Ellis et al. | 715/716 |
| 7,051,325 | B2 * | 5/2006 | Choi et al. | 717/168 |
| 8,156,076 | B2 * | 4/2012 | Hayashi et al. | 707/618 |
| 2003/0149985 | A1 * | 8/2003 | Ohno et al. | 725/58 |
| 2004/0205813 | A1 * | 10/2004 | Kim | 725/39 |
| 2006/0064727 | A1 * | 3/2006 | Cho | 725/68 |
| 2008/0113656 | A1 * | 5/2008 | Lee et al. | 455/414.3 |
| 2008/0209413 | A1 * | 8/2008 | Kakumani et al. | 717/172 |
| 2009/0210547 | A1 * | 8/2009 | Lassen et al. | 709/230 |

* cited by examiner

*Primary Examiner* — Kristine Kincaid
*Assistant Examiner* — Sumaiya A Chowdhury
(74) *Attorney, Agent, or Firm* — Lee, Wong, Degerman, Kang & Waimey

(57) ABSTRACT

A method for updating broadcasting program information in a mobile terminal, the terminal capable of receiving the broadcasting program from a plurality of frequency bands is disclosed, the method includes selecting at least one frequency band including the plurality of broadcasting channels or a broadcasting channel in the plurality of frequency bands; and attempting an update on the broadcasting program information of the entire broadcasting channel within the selected frequency band or the selected broadcasting channel.

10 Claims, 12 Drawing Sheets

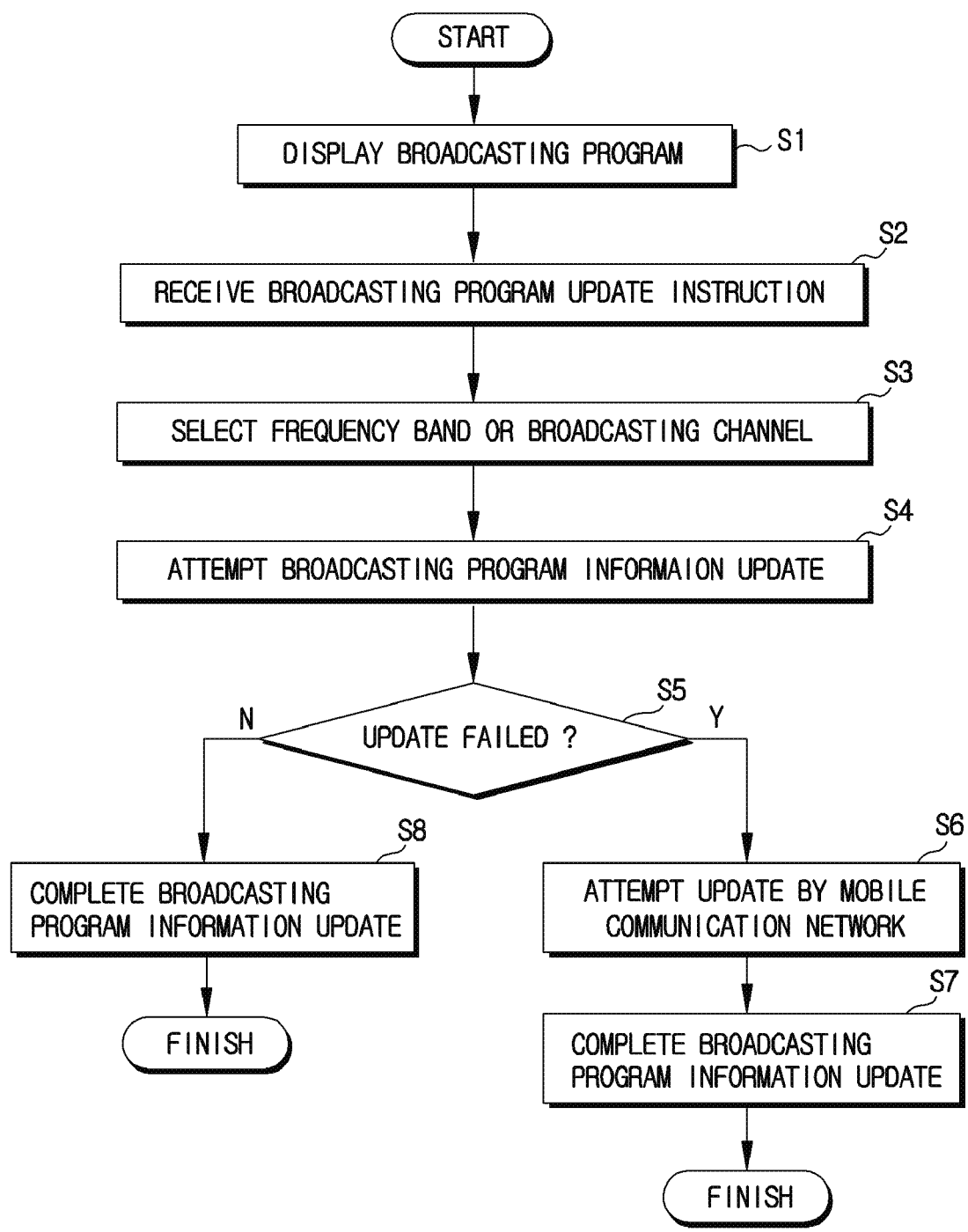

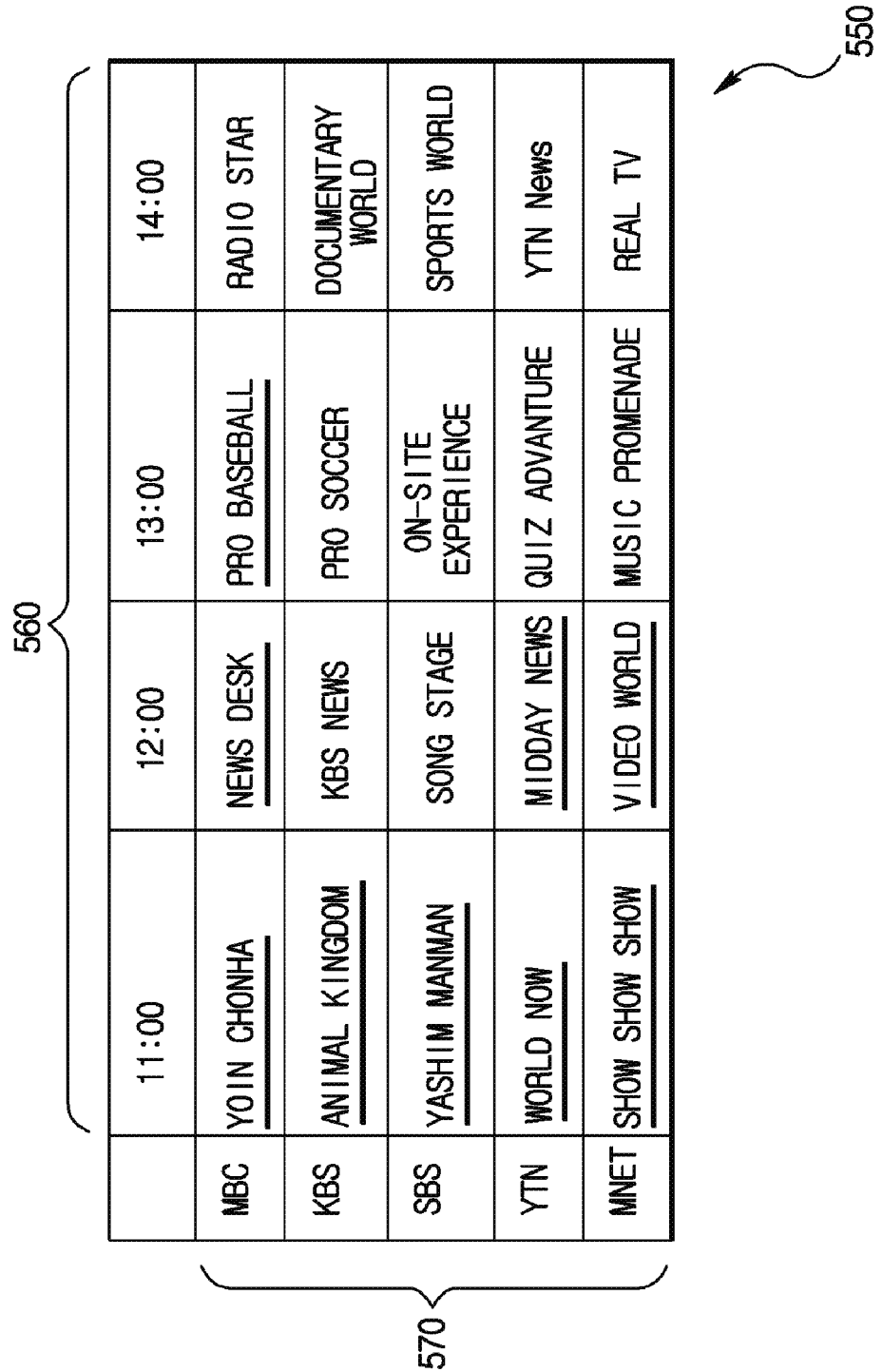

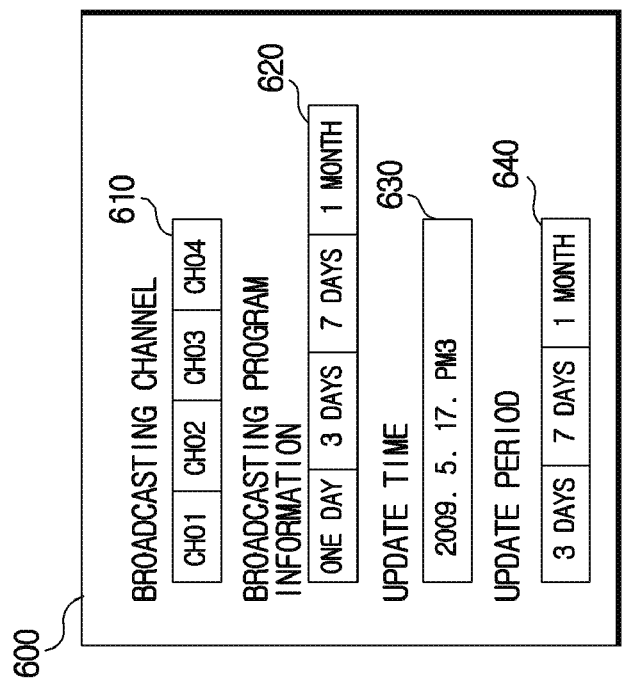

METHOD FOR UPDATING BROADCASTING PROGRAM INFORMATION IN TERMINAL AND MOBILE TERMINAL USING THE SAME

Pursuant to 35 U.S.C. §119 (a), this application claims the benefit of earlier filing date and right of priority to Korean Patent Application No. 10-2009-0050272, filed on Jun. 8, 2009, the contents of which are hereby incorporated by reference in their entirety.

BACKGROUND OF THE DISCLOSURE

1. Field

The present disclosure relates to a method for updating broadcasting program information in a terminal and a mobile terminal using the same.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To implement the complex functions in the multimedia player, improvement of structural parts and/or software parts of the terminal may be considered in various attempts.

Concomitant with development of Internet, moving pictures can be viewed via a mobile terminal. IPTV (Internet Protocol Television) may be an example of the Internet moving pictures.

Furthermore, the mobile terminal can send text messages, moving pictures and MMS (Multimedia Message Service) capable of sending messages by attaching audio files.

SUMMARY

Objects of the present disclosure are to provide a method for updating broadcasting program information in a mobile capable of receiving broadcasting programs from a plurality of frequency bands, the method capable of transmitting to a user broadcasting program information of a broadcasting channel belonging to a particular broadcasting channel or a particular frequency band including the plurality of broadcasting channels, and a mobile terminal using the same.

In one general aspect of the present disclosure, a method for updating broadcasting program information in a mobile terminal, the terminal capable of receiving the broadcasting program from a plurality of frequency bands, the method may comprise selecting at least one frequency band including the plurality of broadcasting channels or a broadcasting channel in the plurality of frequency bands; and attempting an update on the broadcasting program information of the entire broadcasting channel within the selected frequency band or the selected broadcasting channel.

In some exemplary embodiments, the step of at least one frequency band including the plurality of broadcasting channels or a broadcasting channel in the plurality of frequency bands may comprise entering into a broadcasting channel in response to user selection; and selecting a frequency band belonging to the broadcasting channel.

In some exemplary embodiments, the step of at least one frequency band including the plurality of broadcasting channels or a broadcasting channel in the plurality of frequency bands may comprise pre-setting one of the frequency band and the broadcasting channel via a user input unit.

In some exemplary embodiments, a method for updating broadcasting program information may further comprise determining whether the update is being progressed; activating at least one of a mobile communication module and a wireless Internet module for access to an external server; and updating by using the broadcasting program information pre-stored in the external serve if the update is not progressed.

In some exemplary embodiments, the step of selecting at least one frequency band including the plurality of broadcasting channels or a broadcasting channel in the plurality of frequency bands may comprise comparing the pre-stored broadcasting program information with a reception-desired broadcasting program information to determine whether the reception-desired broadcasting program information is a latest version of broadcasting program information; and selecting a broadcasting channel of the latest version of broadcasting program information or a frequency band including the plurality of broadcasting channels belonging to the broadcasting channel if the reception-desired broadcasting program information is not the latest version of broadcasting program information.

In some exemplary embodiments, the step of selecting at least one frequency band including the plurality of broadcasting channels or a broadcasting channel in the plurality of frequency bands may comprise displaying on a display of the terminal a broadcasting program list discretely displaying a broadcasting channel that needs the update; and selecting the broadcasting channel or the frequency band including the plurality of broadcasting channels by using the displayed broadcasting program list.

In some exemplary embodiments, the step of attempting an update on the broadcasting program information of the entire broadcasting channel within the selected frequency band or the selected broadcasting channel may comprise measuring an update time of a to-be-updated broadcasting program information and displaying the same; and attempting the update in response to a user selection signal.

In some exemplary embodiments, a method for updating broadcasting program information may further comprise setting up the types of broadcasting program information, wherein the step of attempting an update on the broadcasting program information of the entire broadcasting channel within the selected frequency band or the selected broadcasting channel may comprise attempting the update on the broadcasting program information based on the set-up types of broadcasting program information.

In some exemplary embodiments, the step of selecting at least one frequency band including the plurality of broadcasting channels or a broadcasting channel in the plurality of frequency bands may comprise displaying a channel selection menu on the display of the terminal; and using the channel selection menu to select a broadcasting channel or a frequency band including the plurality of broadcasting channels.

In another general aspect of the present disclosure, a mobile terminal using a method for updating broadcasting program information comprises a broadcasting receiving module configured to receive a broadcasting program from a plurality of frequency bands; and a controller using a single tuner to control the broadcasting receiving module for attempting an update on the entire broadcasting channel in the selected frequency band or the broadcasting program information of the selected broadcasting channel if at least one frequency band or broadcasting channel in the plurality of frequency bands is selected.

In some exemplary embodiments, the mobile terminal may further comprise a user input unit configured to select the broadcasting channel, wherein the controller controls the broadcasting receiving module for attempting an update on the broadcasting program information of the entire broadcasting channel in the frequency band by selecting the frequency band including the plurality of broadcasting channels if the user input unit selects the broadcasting channel and enters into the broadcasting channel.

In some exemplary embodiments, the mobile terminal may further comprise a user input unit configured to select the selected frequency band or the selected broadcasting channel, wherein the broadcasting receiving module comprises a single tuner, and wherein the controller uses the single tuner for controlling an attempt to update on the broadcasting program information of the entire broadcasting channel in the selected frequency band including the plurality of broadcasting channels or the selected broadcasting channel if one of the frequency band or the broadcasting channel is pre-set through the user input unit.

In some exemplary embodiments, the mobile terminal may further comprise a memory configured to store the broadcasting program information, wherein the controller compares the pre-stored broadcasting program information with the reception-desired broadcasting program information to determine whether the reception-desired broadcasting program information is a latest version of broadcasting program information, and controllably selects the broadcasting channel or the frequency band of the broadcasting channel if the reception-desired broadcasting program information is not the latest version of broadcasting program information.

In some exemplary embodiments, the controller may discretely display on the display of the terminal a broadcasting program list discretely displaying a broadcasting channel that needs update, and wherein the mobile terminal may further comprise a user input unit for selecting the broadcasting channel of the displayed broadcasting program list.

In some exemplary embodiments, the controller may measure an update time of a to-be-updated broadcasting program information and controllably display an estimated update time on the display.

In some exemplary embodiments, the mobile terminal may further comprise a user input unit configured to select the broadcasting program, and wherein the controller may activate at least one of the mobile communication module and the wireless Internet module to controllably update the broadcasting program information pre-stored in an external server if the broadcasting channel is changed by the user input unit while the update is being progressed.

In some exemplary embodiments, the mobile terminal may further comprise a display configured to display a broadcasting program list discretely displaying a broadcasting channel that needs update, and wherein the controller uses the single tuner to control the broadcasting receiving module for attempting an update on the broadcasting program information of the entire broadcasting channel in the selected frequency band or the selected broadcasting channel if the broadcasting channel or the frequency band is selected by using the broadcasting program schedule displayed on the display.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a flowchart of a method for updating broadcasting program information in a terminal according to a first exemplary embodiment of the present disclosure;

FIGS. 9a and 9b are an image view of a mobile terminal according to a second exemplary embodiment of a method for updating broadcasting program information in a terminal according to the present disclosure; and FIG. 10 is an image view of a mobile terminal applied with a modified embodiment of the second exemplary embodiment of a method for updating broadcasting program information in a terminal according to the present disclosure.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

Figure 1:
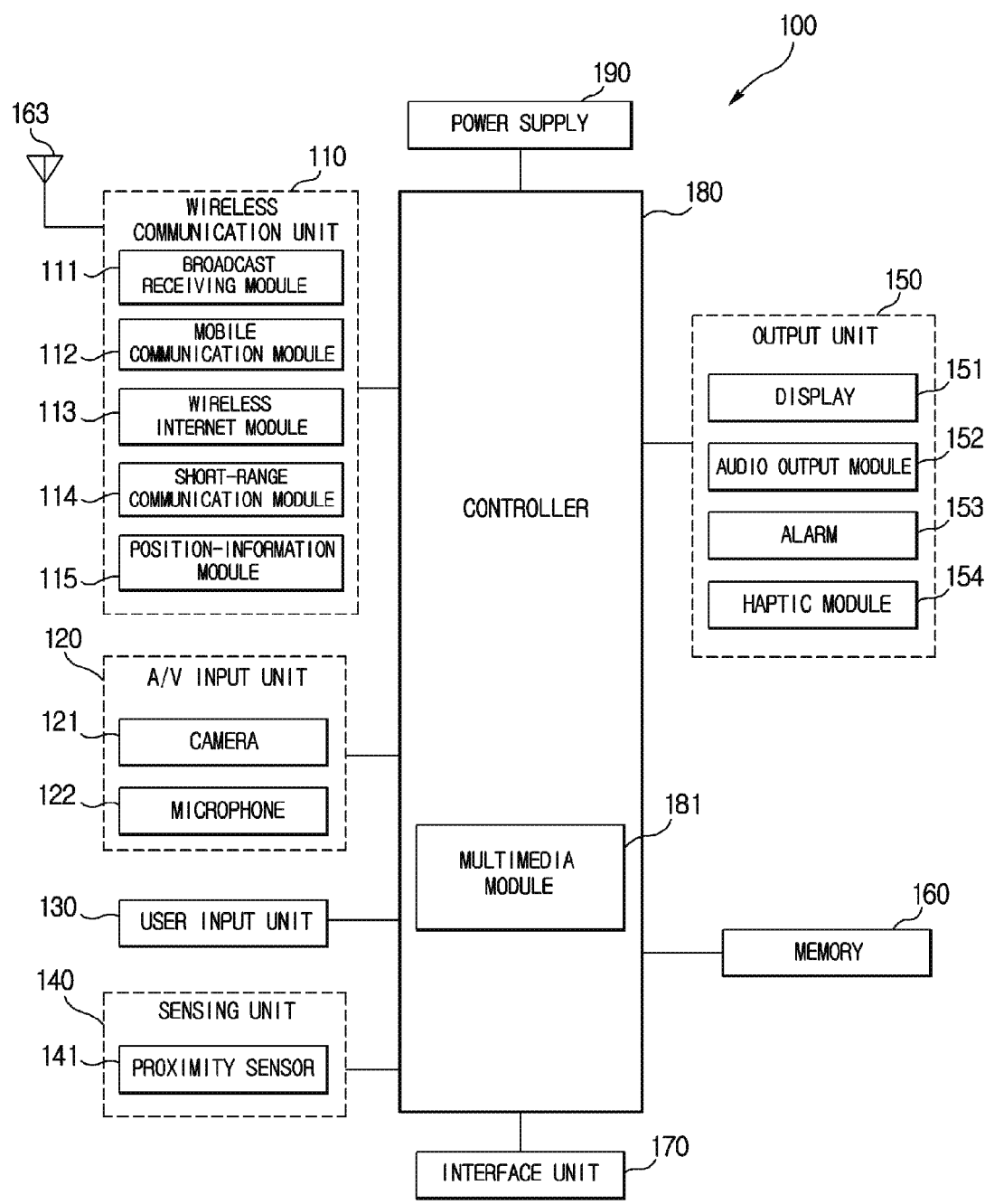
FIG. 1 is a block diagram of a mobile terminal according to an exemplary embodiment of the present disclosure.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (AN) input unit 120, a user input unit 130, a sensing unit 140, an output unit 150, a memory 160, an interface unit 170, a controller 180 and a power supply unit 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply unit 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like.

The output unit 150 may include a display 151, an audio output module 152, an alarm unit 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touch screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touch screen is an electrostatic type, the proximity sensor 141 may detect proximity of a pointer using a variation of an electric field according to the proximity of the pointer. In this case, the touch screen (touch sensor) may be classified into the proximity sensor.

An action in which a pointer approaches the touch screen without contacting the touch screen may be called a proximity touch. An action in which a pointer actually touches the touch screen may be called a contact touch. The location of the touch screen proximity-touched by the pointer may be the position of the pointer that vertically opposes the touch screen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touch screen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm unit 153 may output a signal for announcing an event occurrence of the mobile terminal 100. An event occurring in the mobile terminal 100 may include one of a call signal reception, a message reception, a key signal input, a touch input and/or the like. The alarm unit 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm unit 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touch screen as a character and/or recognizing a picture drawing input performed on the touch screen as an image.

The power supply unit 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
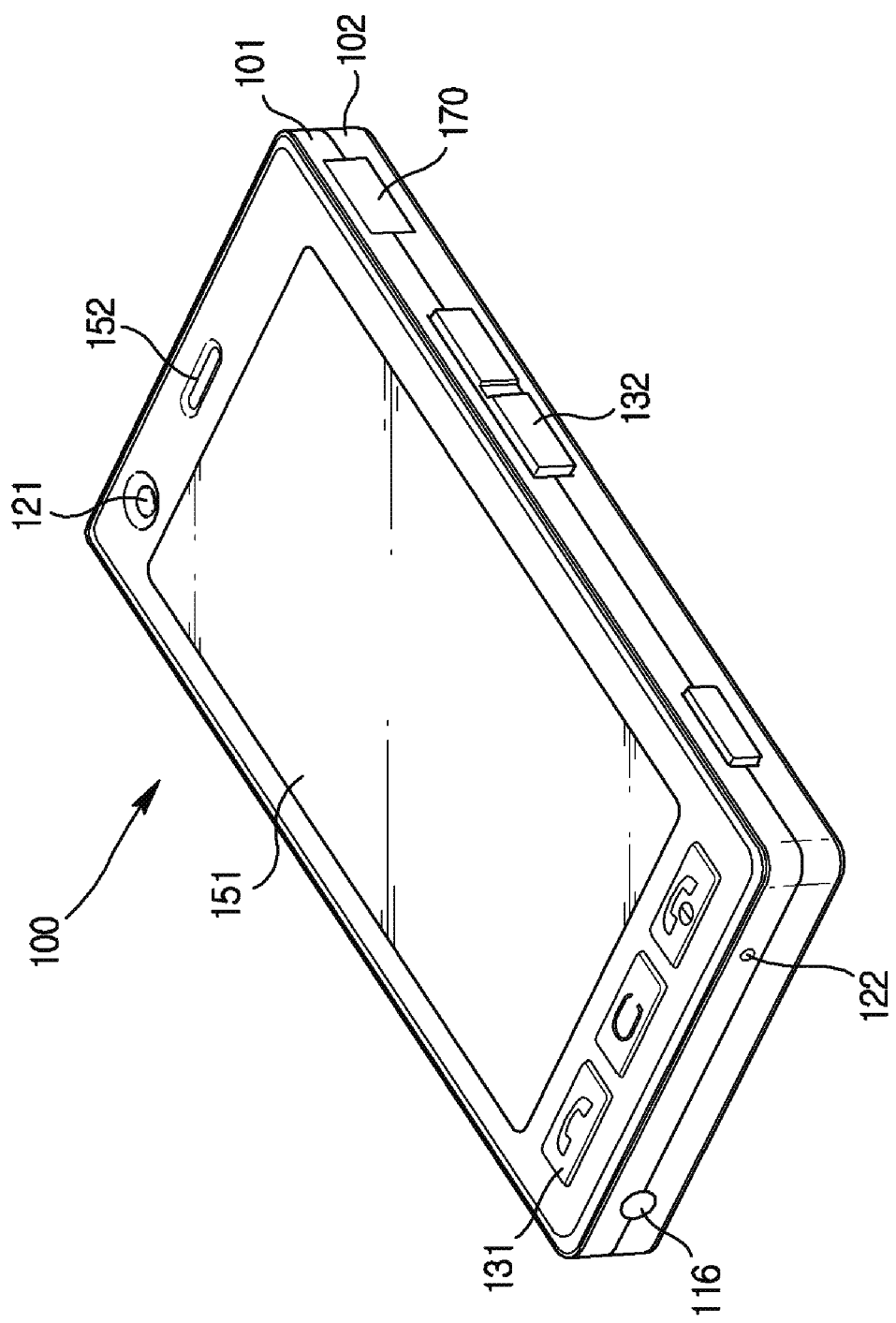
FIG. 2a is a front perspective view of a mobile terminal according to an exemplary embodiment of the present disclosure.

FIG. 2*a* is a front-view of a mobile terminal according to an example embodiment. Other embodiments, configurations and arrangements may also be provided.

As shown in FIG. 2*a*, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
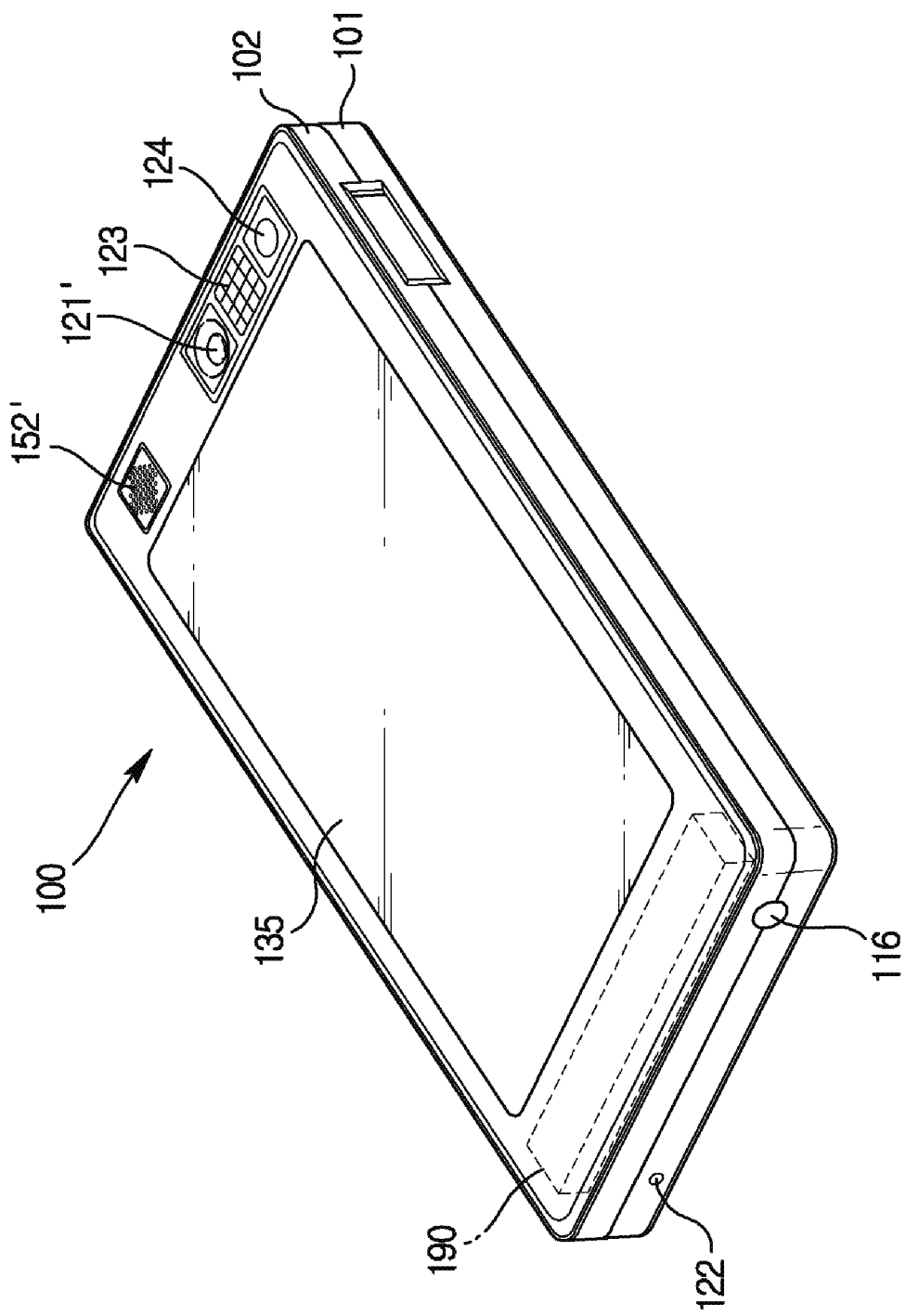
FIG. 2b is a backside perspective view of a mobile terminal according to an exemplary embodiment of the present disclosure.

FIG. 2*b* is a perspective diagram of a backside of the mobile terminal shown in FIG. 2*a*. Other embodiments, configurations and arrangements may also be provided.

As shown in FIG. 2*b*, a camera 121' may be additionally provided on a backside of the terminal body, and more particularly on the rear case 102. The camera 121' may have a photographing direction that is substantially opposite to a photographing direction of the camera 121 (shown in FIG. 2*a*) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2a and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply unit 190 for supplying a power to the mobile terminal 100 may be provided to the terminal body. The power supply unit 190 may be built within the terminal body. Alternatively, the power supply unit 190 may be detachably connected to the terminal body.

FIG. 2b also shows a touchpad 135 for detecting a touch that is additionally provided on the rear case 102. The touchpad 135 may be configured in a light transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

In the following description, the method for updating broadcasting program information in a mobile terminal according to exemplary embodiments of the present disclosure will be explained, referring to the accompanying FIGS. 3 and 4.

Figure 4:
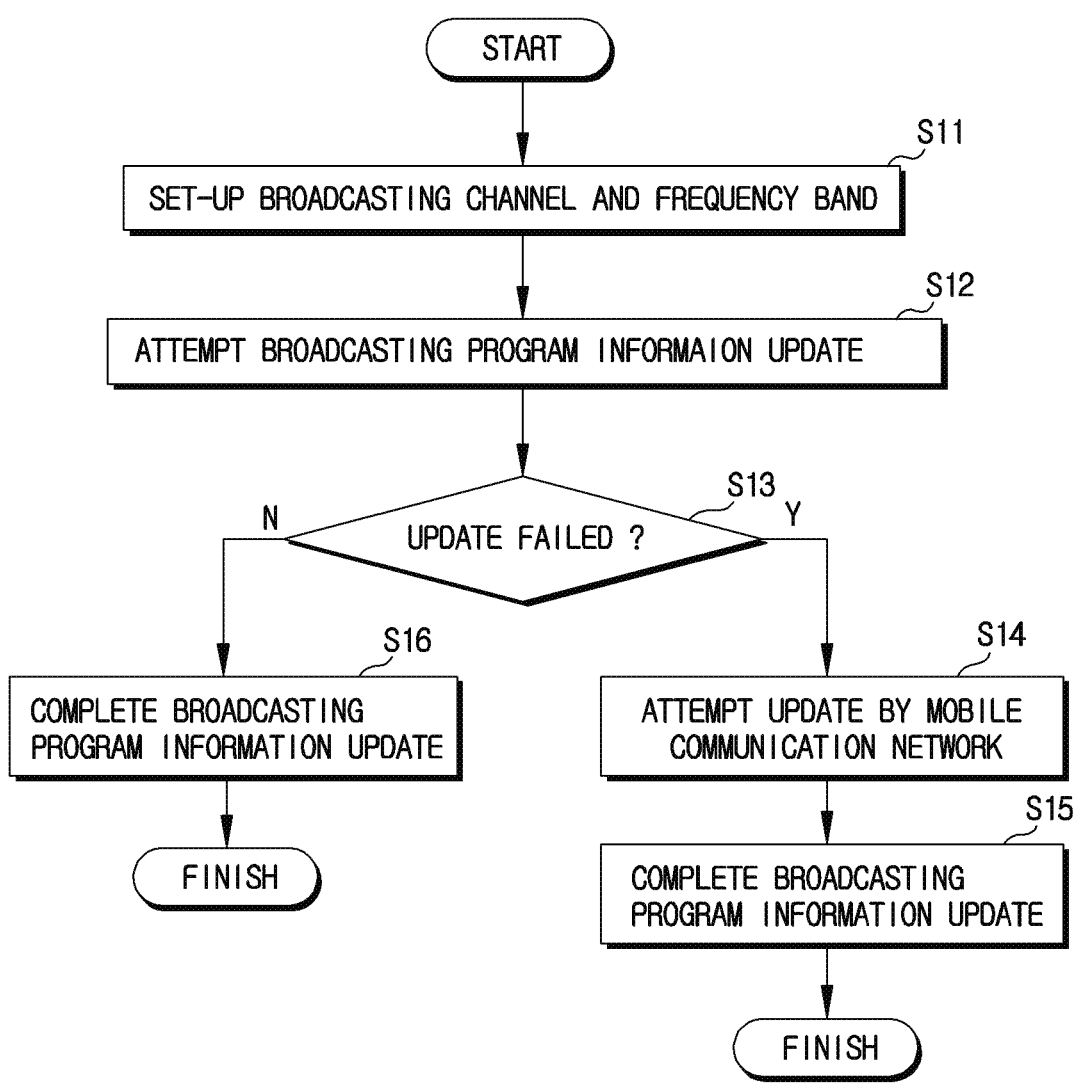
FIG. 4 is a flowchart of a method for updating broadcasting program information in a terminal according to a second exemplary embodiment of the present disclosure.

FIG. 3 is a flowchart of a method for updating broadcasting program information in a terminal according to a first exemplary embodiment of the present disclosure, and FIG. 4 is a flowchart of a method for updating broadcasting program information in a terminal according to a second exemplary embodiment of the present disclosure.

First Exemplary Embodiment

As shown in FIG. 3, first of all, a user employs a user input unit 130 to activate a broadcasting receiving module 111, whereby a broadcasting program is displayed on the display 151 (S1). The user gives an input command for updating broadcasting program information through the user input unit 130 while the broadcasting program is being displayed (S2). Then, the display 151 is displayed with a broadcasting program information update menu screen from which a frequency band or a broadcasting channel is selected (S3).

The frequency band may include at least one broadcasting channel. Meanwhile, omitting the step of S3, an update of broadcasting program information displayed as a background may be attempted while the broadcasting program is displayed on the display 151.

In a case the frequency band or the broadcasting channel is selected, the controller 180 controls the broadcasting receiving module 111 having a single tuner, and attempts to update on the broadcasting program information of the relevant frequency band or the broadcasting channel (S4).

At this time, the controller 180 may employ data amount of broadcasting program information and bit rate of the currently receiving broadcasting channel to check an update time, and the update time may be displayed on the display 151. In a case a predetermined event occurs to further disable the update on the broadcasting program information (S5) while the controller 180 updates the broadcasting program information through the broadcasting receiving module 111, the controller 180 activates the mobile communication module 112 or the wireless Internet module 113 for access to an external server, and uses an Internet protocol address pre-stored in a memory to keep updating the broadcasting program information, whereby the update is completed (S6, S7).

At this time, the memory 160 of the mobile terminal may be stored with a web address or a particular identifier for updating the broadcasting information. Meanwhile, at S5, in a case the update is being carried out continuously, the update on the broadcasting program information is completed (S8), and the display 151 of the mobile terminal 100 may be displayed with a broadcasting program information update completion message.

According to the first exemplary embodiment, the user can update a desired frequency band or broadcasting program information of broadcasting channel while receiving the broadcasting in a mobile terminal capable of receiving a broadcasting program from a plurality of frequency bands.

Second Exemplary Embodiment

FIG. 4 is a flowchart of a method for updating broadcasting program information in a terminal according to a second exemplary embodiment of the present disclosure.

In the second exemplary embodiment illustrated in FIG. 4, unlike the first exemplary embodiment, the broadcasting program is not displayed on the display 151 by activating the broadcasting receiving module 111 using the user input unit 130, a menu screen is pre-set with a broadcasting channel desired to update broadcasting program information, a frequency band, an update timing, an update period, types of broadcasting program information (S11).

Next, if the set-up condition is satisfactory, the controller 180 attempts to update the set-up type of broadcasting program information for set-up broadcasting channel or frequency band using the broadcasting receiving module 111 having a single tuner (S12). The frequency band may include at least one broadcasting channel. At this time, the controller 180 may use data amount of broadcasting program information and bit rate of the currently receiving broadcasting channel to check an update time, and allow the update time to be displayed on the display 151.

In a case a predetermined event occurs to further disable the update on the broadcasting program information (S13) while the controller 180 updates the broadcasting program information through the broadcasting receiving module 111, the controller 180 activates the mobile communication module 112 or the wireless Internet module 113 to keep updating the broadcasting program information, whereby the update is completed (S14, S15). At this time, a web address or a particular identifier capable of updating the broadcasting program information stored in the memory 160 of the mobile terminal 100 may be used for updating the broadcasting information.

Meanwhile, at Step 13, if the update is continuously implemented, the update of the broadcasting program information can be completed (S16), and the display 151 of the mobile terminal 100 may be displayed with a broadcasting program information update completion message.

According to the second exemplary embodiment, even if the user does not separately give an update command on the broadcasting program information, the broadcasting program information can be automatically updated from the plurality of frequency bands.

Now, hereinafter, detailed exemplary embodiments of the present invention will be provided using image views of the mobile terminal applied with a method for updating broadcasting program information.

Figure 5:
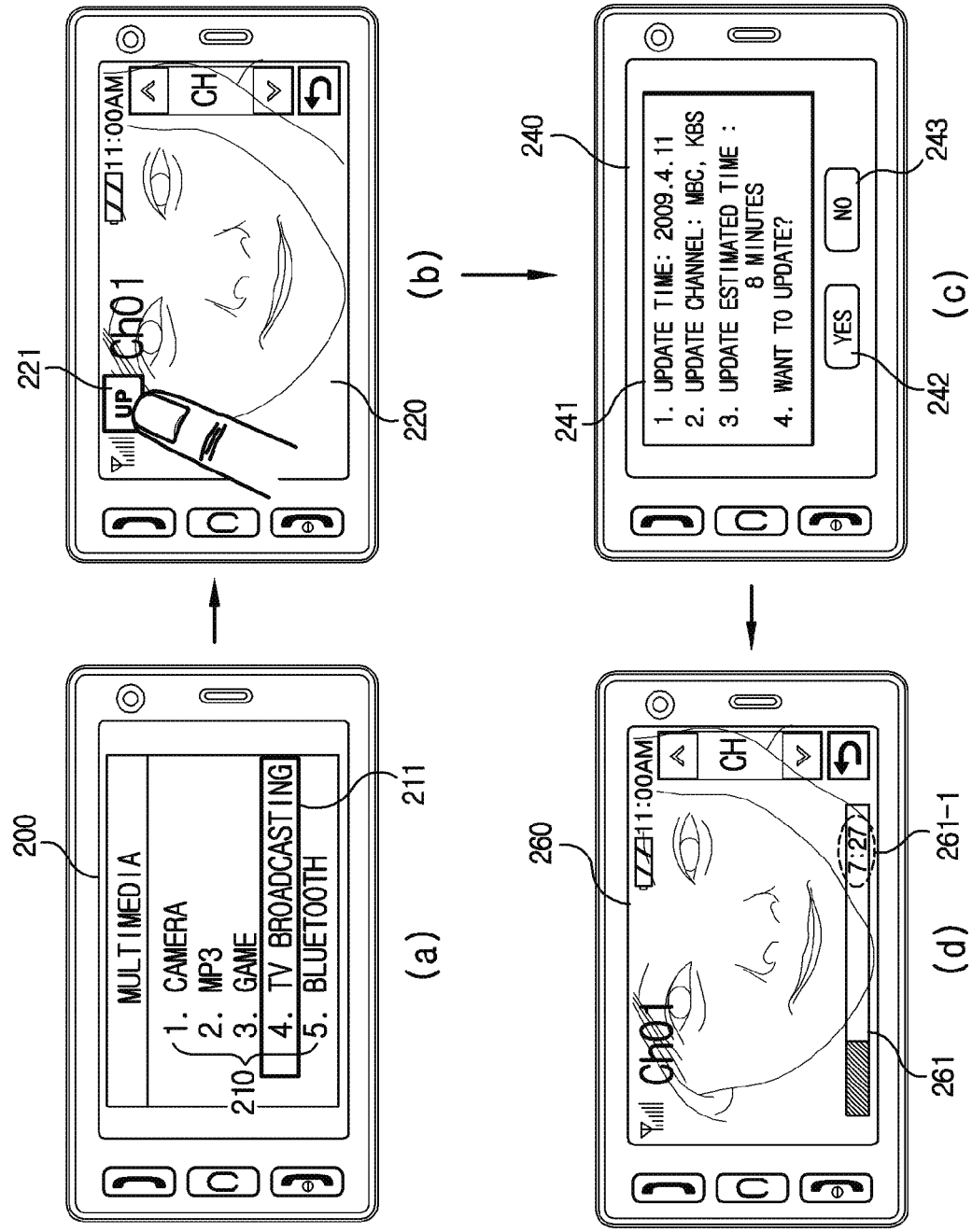
FIG. 5 is an image view of mobile terminal applied with the first exemplary embodiment of a method for updating broadcasting program information in a terminal according to the present disclosure.
Figure 6:
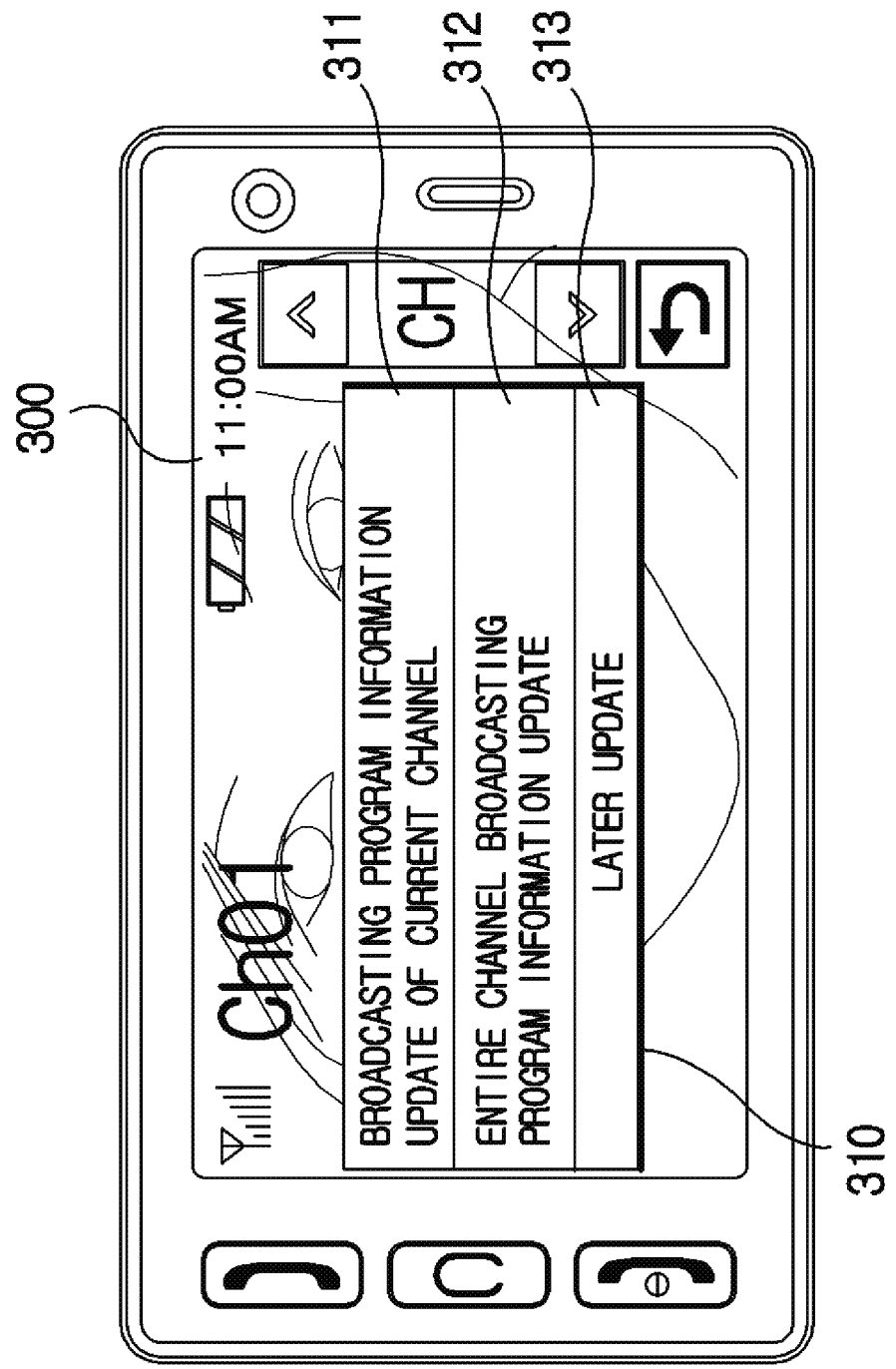
FIG. 6 is an image view of a mobile terminal applied with a modified embodiment of the first exemplary embodiment of a method for updating broadcasting program information in a terminal according to the present disclosure.
Figure 7:
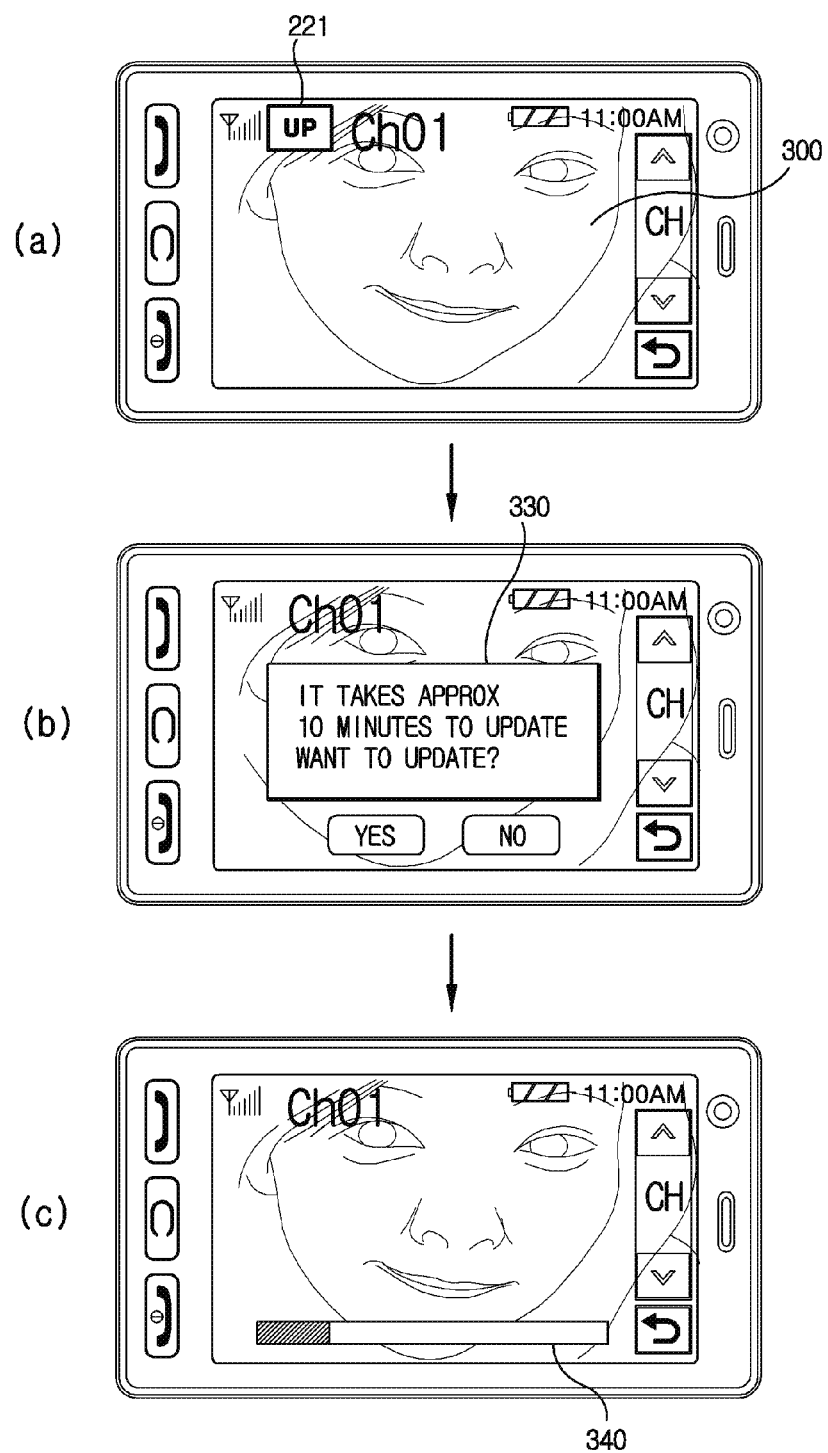
FIG. 7 is an image view of a mobile terminal applied with anther modified embodiment of the first exemplary embodiment of a method for updating broadcasting program information in a terminal according to the present disclosure.
Figure 8:
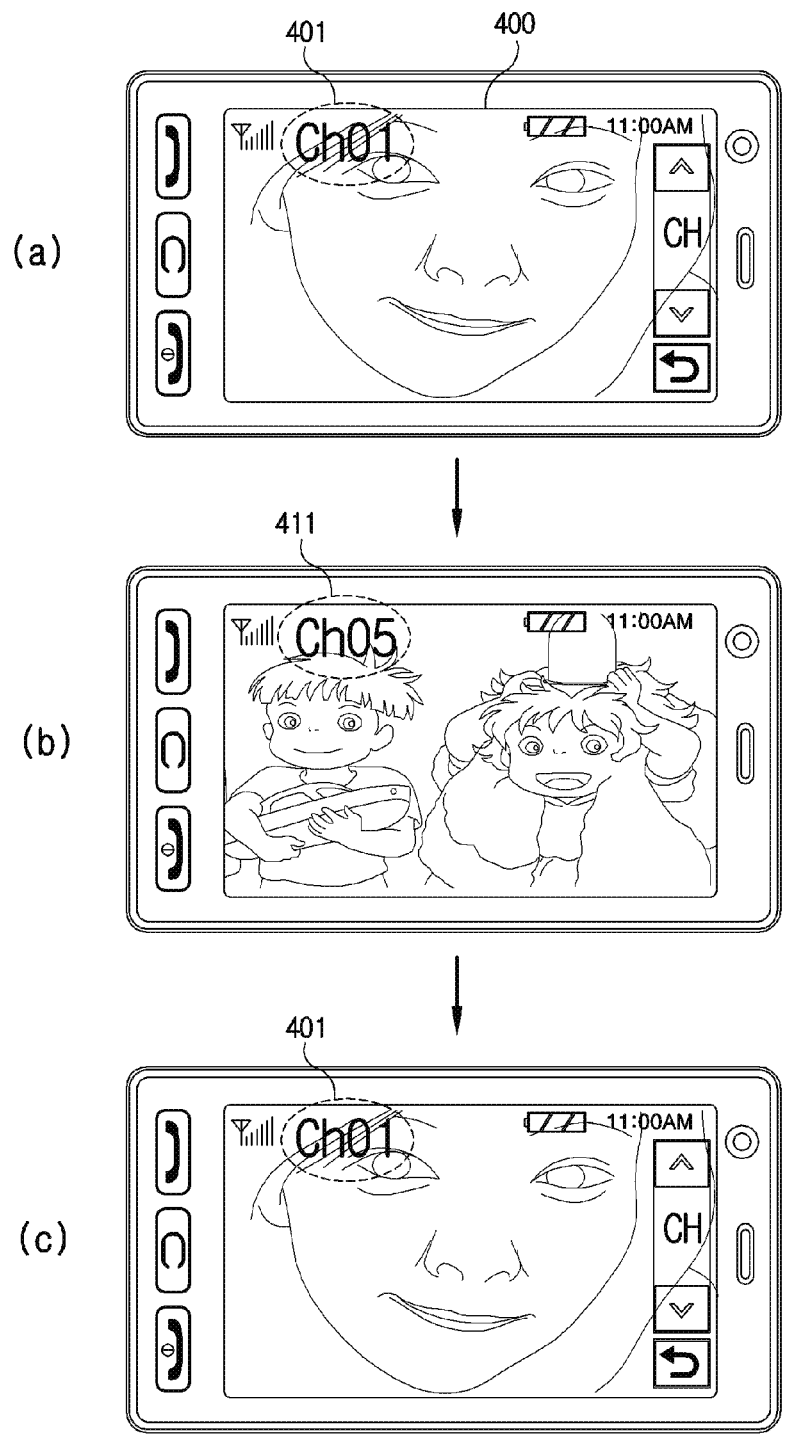
FIG. 8 is an image view of a mobile terminal according to a first exemplary embodiment of a method for updating broadcasting program information in a terminal according to the present disclosure.
Figure 9A:
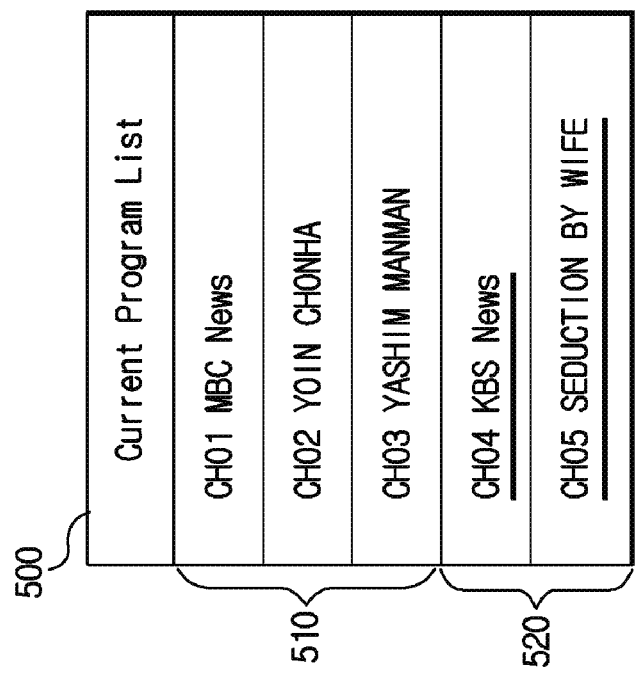

FIG. 5 is an image view of mobile terminal applied with the first exemplary embodiment of a method for updating broadcasting program information in a terminal according to the present disclosure, FIG. 6 is an image view of a mobile terminal applied with a modified embodiment of the first exemplary embodiment of a method for updating broadcasting program information in a terminal according to the present disclosure, FIG. 7 is an image view of a mobile terminal applied with anther modified embodiment of the first exemplary embodiment of a method for updating broadcasting program information in a terminal according to the present disclosure, FIG. 8 is an image view of a mobile terminal according to a first exemplary embodiment of a method for updating broadcasting program information in a terminal according to the present disclosure, FIGS. 9a and 9b are an image view of a mobile terminal according to a second exemplary embodiment of a method for updating broadcasting program information in a terminal according to the present disclosure, and FIG. 10 is an image view of a mobile terminal applied with a modified embodiment of the second exemplary embodiment of a method for updating broadcasting program information in a terminal according to the present disclosure.

Examples of First Exemplary Embodiment

FIG. 5 is an image view of mobile terminal applied with the first exemplary embodiment of a method for updating broadcasting program information in a terminal according to the present disclosure.

FIG. 5a illustrates a multimedia menu screen 200 of the mobile terminal 100. The multimedia menu screen 200 may include a plurality of multimedia sub-menus 210, and one of the multimedia sub-menus 210 is a TV broadcasting item 211.

In a case the user selects the TV broadcasting item 211 using the user input unit 130, a broadcasting screen 220 is displayed on the display as shown in FIG. 5b after a predetermined lapse of time. The broadcasting screen 220 is displayed with an update indicator 221.

In a case the user selects the update indicator 221, an update related information of the broadcasting program information is displayed on the display (see FIG. 5c). FIG. 5c illustrates a broadcasting program information update screen 240, which may include an update window 241, "YES" icon 242 and "NO" icon 243.

The update window 241 may be described with information such as an update time (version information) of broadcasting program information currently stored in the memory 160, channel information on updated broadcasting program information, an update expected time and an update consumption time. The window may also include a message inquiring an update of the broadcasting program information.

In a case the user uses the user input unit 130 to select the "YES" icon 242, the broadcasting program is kept being displayed, and broadcasting program information to which the broadcasting channel belongs is updated in background.

FIG. 5d illustrates a broadcasting program update screen 260. As shown in FIG. 5d, the broadcasting program update screen 260 is displayed with an update progressive bar 261, whereby the user can know the degree of update in background. At this time, residual time information 261-1 may be displayed on the progressive bar 261.

Meanwhile, the update indicator 221 functions as an indicator notifying whether the broadcasting program information is currently updated in background. That is, in a case the broadcasting program information is updated while the broadcasting program is displayed, the update indicator 221 may be changed in its color or may be treated as a highlight.

FIG. 6 is an image view of a mobile terminal applied with a modified embodiment of the first exemplary embodiment of a method for updating broadcasting program information in a terminal according to the present disclosure.

FIG. 6 illustrates an exemplary embodiment in which a channel selection menu screen 300 is displayed on the display in a case the update indicator 221 of FIG. 5 is selected. The channel selection menu screen 300 may include a current channel broadcasting program information update item 311, an entire channel broadcasting program information update item 312 and a later update item 313.

In a case one of the update items 311-313 is selected, the controller 180 updates the broadcasting program information in response to the selection. For example, in a case the current channel broadcasting program information update item 311 is selected, the currently viewed broadcasting program is displayed on the display 151, and the broadcasting program item 312 is updated in background. In a case the entire channel broadcasting program information update item 312 is selected, the controller 180 controls the single tuner of the broadcasting receiving module 111 to update each broadcasting program information from the plurality of frequency bands.

FIG. 7 is an image view of a mobile terminal applied with anther modified embodiment of the first exemplary embodiment of a method for updating broadcasting program information in a terminal according to the present disclosure.

As shown in FIG. 7(a), the broadcasting screen 300 is displayed with the update indicator 221. In a case the update indicator 221 is selected, an update consumption time message 330 is displayed on the display as shown in FIG. 7(b). The update consumption time is a result of calculation by the controller 180 on a bit rate of the currently receiving data and data amount of the broadcasting program information.

In a case the user selects the "YES" key to attempt the update while the update consumption time message 330 is displayed, the controller 180 controls the broadcasting communication module 111 to progress the update of the broadcasting program information, and as illustrated in FIG. 7(c), an update progressive bar 340 is displayed on the update of the broadcasting program information while the broadcasting screen is displayed on the display.

Meanwhile, in a case the update of the broadcasting channel program information cannot be updated due to entry to a shaded area, the controller 180 activates the mobile communication module 112 or the wireless Internet module 113 to download the broadcasting program information stored in a server terminal. At this time, a download consumption time may be calculated using a download bit rate of the mobile communication module 112 or the wireless Internet module 113 and data amount of the to-be-uploaded broadcasting program information, where the controller 180 may display the calculated download consumption time on the display.

FIG. 8 is an image view of a mobile terminal according to a first exemplary embodiment of a method for updating broadcasting program information in a terminal according to the present disclosure.

FIG. 8 (*a*) illustrates a first broadcasting screen 400. Reference numeral 401 defines a first broadcasting channel displayed on the display. At this time, a broadcasting program information of the first broadcasting channel is being progressed. While the first broadcasting channel is displayed on the display, that is, the single tuner of the broadcasting receiving module 111 is being tuned to the first broadcasting channel, a second broadcasting channel 411 is displayed on the display as shown in FIG. 8 (*b*) in a case the user changes the broadcasting channel using the user input unit 130.

At this time, due to the second broadcasting channel 411 being different from the first broadcasting channel frequency band, the broadcasting program information of the first broadcasting cannot be updated. Then, the controller 180 automatically activates the mobile communication module 111 or the wireless Internet module 112 download the broadcasting program information of the first broadcasting channel from the external server. Otherwise, the broadcasting channel is changed again to the first broadcasting channel 401 as shown in FIG. 8(*c*), the stopped update of the first broadcasting program information can be progressed again.

Examples of Second Exemplary Embodiment

FIGS. 9*a* and 9*b* are an image view of a mobile terminal according to a second exemplary embodiment of a method for updating broadcasting program information in a terminal according to the present disclosure.

FIG. 9*a* shows a first example of a broadcasting program list 500. The broadcasting program list 500 discretely displays a first broadcasting program group 510 which is the latest broadcasting program information and a second broadcasting program group 520 which is not the latest broadcasting program information and needs to be updated, each underlined in different color and background color, as depicted in FIG. 9*a*.

At this time, whether update is needed or not can be determined using version information inside the broadcasting program information data or generation date information. The user can verify a broadcasting channel that needs an update. In a case the user selects a broadcasting channel desired to be updated, the controller 180 activates the broadcasting receiving module 111, the mobile communication module 112 or the wireless Internet module 113 to implement an update on the broadcasting program information of the selected broadcasting channel.

FIG. 9*b* shows a second example of the broadcasting program list 550. A horizontal axis 560 of the broadcasting program list 550 is a time axis, while a vertical axis 570 is a broadcasting channel axis. In the second example, a table type list is provided. As a result, the user can easily verify whether more pieces of broadcasting program information is the latest version. That is, as shown in the figure, a latest version of broadcasting program information is underlined, while broadcasting program information which is not the latest version is not underlined. The differentiation may be implemented by using color of program name, background color, font and the like.

The user can verify a broadcasting channel and a broadcasting time that need an update from the list 550. In a case the user selects a broadcasting channel desired to be updated, the controller 180 activates the broadcasting receiving module 111, the mobile communication module 112 or the wireless Internet module 113 to implement the update on the broadcasting program information of the selected broadcasting channel.

As mentioned above, the present exemplary embodiment uses a program list to notify the user a broadcasting channel desired to be updated, and can update the broadcasting program information under the given state.

FIG. 10 is an image view of a mobile terminal applied with a modified embodiment of the second exemplary embodiment of a method for updating broadcasting program information in a terminal according to the present disclosure.

FIG. 10 illustrates a broadcasting program information set-up screen 600 for pre-setting the update on the broadcasting program information. Entry into the set-up screen 600 may be implemented sequentially from a menu screen (not shown), or via a hot key.

The set-up screen 600 displayed on the display 151 may include a broadcasting channel set-up unit 610, a broadcasting program information type set-up unit 620, an update time set-up unit 630 and an update period set-up unit 640. The user may use the broadcasting channel set-up unit 610 can set up the types of broadcasting program information desired to be updated among the broadcasting program information received from the broadcasting receiving module 111 (e.g., 3-day broadcasting program information or 7-day broadcasting program information). The user uses the update time set-up unit 630 may determine the update time of the broadcasting program information.

Furthermore, the user may use the update period set-up unit 640 may set up an update period of the broadcasting program information.

In doing so, in a case the user employs the broadcasting program information set-up screen 600 to finish a set-up related to the update of the broadcasting program information, the controller 180 can automatically operate the broadcasting receiving module 111 to update the broadcasting program information catering to the condition if an update condition is met.

The above-mentioned method for updating a broadcasting program information in terminal and a mobile terminal using the same may, however, be embodied in many different forms and should not be construed as limited to the embodiments set forth herein. While particular features or aspects may have been disclosed with respect to several implementations, such features or aspects may be selectively combined with one or more other features and/or aspects of other implementations as may be desired.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for updating broadcasting program information in a mobile terminal capable of receiving a plurality of frequency bands and a plurality of broadcasting channels, the method comprising:
   selecting at least one frequency band of the plurality of frequency bands or a specific broadcasting channel of the plurality of broadcasting channels in response to a first touch-input received via an input medium on a display unit of the mobile terminal; and
   displaying a first broadcasting program on the display unit, the first broadcasting program associated with the selected at least one frequency band or the selected specific broadcasting channel and received via a broadcasting receiving module of the mobile terminal;
   receiving a second touch-input via the input medium to select an update of broadcasting program information of the displayed first broadcasting program, the second touch-input received via an icon that indicates that the update of the broadcasting program information of the displayed first broadcasting program is required;
   updating the broadcasting program information of the displayed first broadcasting program while maintaining the display of the first broadcasting program;
   receiving a third touch-input to change the first broadcasting program displayed on the display unit to a second broadcasting program received via the broadcasting receiving module;
   ceasing the update of the broadcasting program information of the first broadcasting program while maintaining the display of the second broadcasting program;
   receiving a fourth touch-input to change the second broadcasting program displayed on the display unit to the first broadcasting program; and
   updating the broadcasting program information of the displayed first broadcasting program by the broadcasting receiving module while maintaining the display of the first broadcasting program,
   wherein selecting at least the one frequency band or the specific broadcasting channel comprises:
      comparing a pre-stored broadcasting program information with a reception-desired broadcasting program information to determine whether the reception-desired broadcasting program information is a latest version of broadcasting program information; and
      selecting the specific broadcasting channel of the latest version of broadcasting program information or selecting the one frequency band including the plurality of broadcasting channels belonging to the specific broadcasting channel if the reception-desired broadcasting program information is not the latest version of broadcasting program information.

2. The method of claim 1, further comprising:
   displaying a broadcasting program list on the display unit that includes at least one broadcasting channel for which a broadcasting program information update is required.

3. The method of claim 1, further comprising:
   displaying a progressive bar on the display unit that includes a degree of the update of the broadcasting program information.

4. The method of claim 3, further comprising:
   displaying an indication on the progressive bar of remaining time required to complete the update of the broadcasting program information.

5. The method of claim 1, wherein the icon further indicates whether the broadcasting program information is updated while maintaining the display of the first broadcasting program.

6. A mobile terminal for updating broadcasting program information, the terminal comprising:
   a display unit configured to receive a touch input via an input medium and to display information;
   a broadcasting receiving module configured to receive a broadcasting program from a plurality of frequency bands and a plurality of broadcasting channels; and
   a controller configured to:
   control the display unit to display the information;
   select at least one frequency band of the plurality of frequency bands or a specific broadcasting channel of the plurality of broadcasting channels in response to a first touch-input received via the display unit;
   control display unit to display a first broadcasting program, the first broadcasting program associated with the selected at least one frequency band or the selected specific broadcasting channel and received via the broadcasting receiving module;
   process a second touch-input received via the display unit to select an update of broadcasting program information of the displayed first broadcasting program, the second touch-input received via an icon that indicates that the update of the broadcasting program information of the displayed first broadcasting program is required;
   control the broadcasting receiving module to update the broadcasting program information of the displayed first broadcasting program while controlling the display unit to maintain the display of the first broadcasting program;
   process a third touch-input received via the display unit to change the displayed first broadcasting program to a second broadcasting program received via the broadcasting receiving module;
   control the broadcasting receiving module to cease the update of the broadcasting program information of the first broadcasting program while controlling the display unit to maintain the display of the second broadcasting program;
   process a fourth touch-input received via the display unit to change the displayed second broadcasting program to the first broadcasting program; and
   control the broadcasting receiving module to update the broadcasting program information of the displayed first broadcasting program while controlling the display unit to maintain the display of the first broadcasting program,
   wherein with regard to selecting at least the one frequency band or the specific broadcasting channel, the controller is further configured to:
      compare a pre-stored broadcasting program information with a reception-desired broadcasting program information to determine whether the reception-desired broadcasting program information is a latest version of broadcasting program information; and
      select the specific broadcasting channel of the latest version of broadcasting program information or select the one frequency band including the plurality of broadcasting channels belonging to the specific broadcasting channel if the reception-desired broadcasting program information is not the latest version of broadcasting program information.

7. The mobile terminal of claim 6, wherein the controller is further configured to:

control the display unit to display a broadcasting program list that includes at least one broadcasting channel for which a broadcasting program information update is required.

8. The mobile terminal of claim 6, wherein the controller is further configured to:
control the display unit to display a progressive bar indicating a degree of the update of the broadcasting program information.

9. The mobile terminal of claim 8, wherein the controller is further configured to:
control the display unit to display a progressive bar on which a remaining time required to complete the update of the broadcasting program information is displayed.

10. The mobile terminal of claim 6, wherein the icon further indicates whether the broadcasting program information is updated while the display unit maintains the display of the first broadcasting program.

* * * * *